No. 614,137. Patented Nov. 15, 1898.
M. SEITZ.
TONGUE CARRIER FOR HARVESTING MACHINES.
(Application filed Sept. 13, 1897.)
(No Model.)
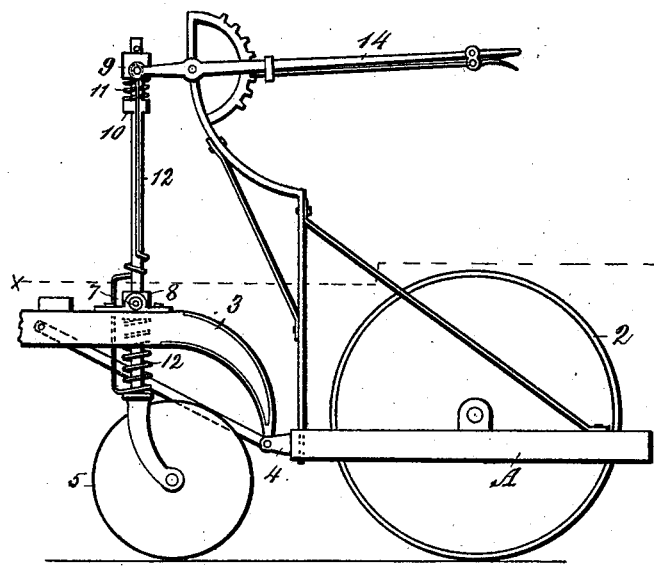
Fig. I.
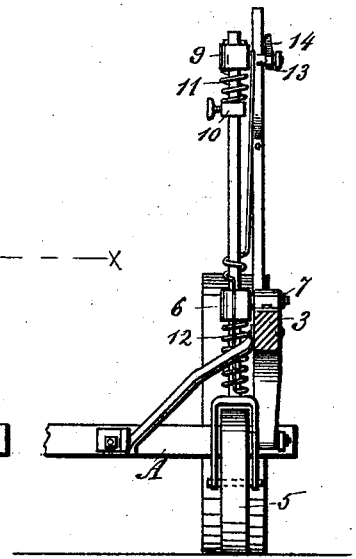
Fig. III.
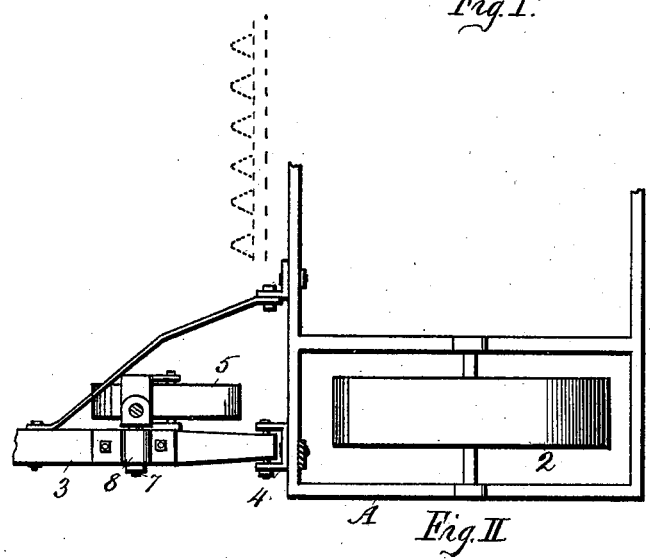
Fig. II.
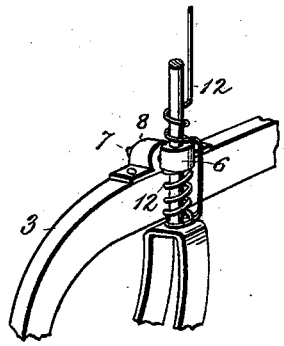
Fig. IV.
Witnesses,
R. S. Millar.
L. M. Adams
Inventor,
Michael Seitz.
By J. Bailey Atty

UNITED STATES PATENT OFFICE.

MICHAEL SEITZ, OF WEISBURG, INDIANA.

TONGUE-CARRIER FOR HARVESTING-MACHINES.

SPECIFICATION forming part of Letters Patent No. 614,137, dated November 15, 1898.

Application filed September 13, 1897. Serial No. 651,543. (No model.)

*To all whom it may concern:*

Be it known that I, MICHAEL SEITZ, a citizen of the United States, residing at Weisburg, in the county of Dearborn and State of Indiana, have invented a new and useful Improvement in Tongue-Carriers for Harvesting-Machines, which improvement is fully set forth in the following specification and accompanying drawings, in which—

Figure 1 is a side view of my improved tongue-carrying attachment for harvesting-machines; Fig. 2, a top plan view of the same; Fig. 3, a front end view, and Fig. 4 a perspective detail view of the tongue and the means for supporting it.

My invention pertains to certain improvements in tongue-carrying attachments for harvesting-machines in general, and my purpose is to provide means whereby draft-animals may be effectually protected from the severe and injurious pressure upon their necks by the tongue superadded to the weight of a large portion of the body of the machine, to reduce the power required to propel the same, and to arrange adequate means for a variable adjustment of the cutter-bar in relation to the surface of the ground.

The peculiar advantages of the invention will be understood by referring to the accompanying drawings, in which A represents the front portion of the framework of a harvesting-machine of the usual construction, and 2 the master-wheel which operates the cutter-bar. The tongue 3, bent at the rear end, as shown, is attached to the front of the machine by a clip 4 and resiliently supported by springs which encircle the stem of the trailing wheel 5. It will be observed that the space between the floor of the machine and the ground beneath it is limited and that while attempts have been made to support straight tongues by caster-wheels the latter were necessarily so small in diameter and restricted in vertical movement that they inevitably sank into the earth or encountered so much resistance when passing over irregular and undulating ground as to call for a material increase of the propelling power and at the same time causing sudden and violent movements of the tongue, all of which more than counterbalance any advantage that is claimed for the arrangement. In order to obviate such disability, I bend the rear end of the tongue, as shown, and thus provide space for a vertically-adjustable trailing wheel sufficiently large for all requirements. The vertical stem of the said wheel slides in a collar 6, having a laterally-projecting pivot 7, which rotatably engages a journal-box 8, attached to the top of the tongue. Being thus arranged, it will be seen that the collar cannot bind on the stem in consequence of any variations in the vertical position of the tongue. A slidable collar 9 is mounted on the upper extremity of the stem and an adjustable collar 10 a short distance below. A spiral spring 11 is coiled around the stem between the bearings thus formed. A coöperating spring 12 is formed by a wire attached at its upper end to an arm 13, which projects laterally from the collar 9 and extends downwardly beside the stem to within a short distance of the lower collar 6. A series of coils being formed, the wire is again extended to the shoulder of the stem and coiled upwardly and reversely to a final bearing under the collar 6. A locking-lever 14 engages the arm 13 and acts simultaneously on said collar and reversely on the springs 11 and 12. It will be seen that when the free end of the lever is depressed the trailing wheel is drawn upwardly and the cutting-bar lowered to a corresponding degree. The importance of this arrangement will be appreciated. When the machine is working in grain which has been prostrated by storms or other causes, the cutter-bar may be readily lowered and will gather the grain which would otherwise be overrun.

What I claim as new is—

In a tongue-carrier for harvesting-machines, the combination of the herein-described bent tongue, the trailing wheel having a rotatable vertical stem, the collar 6 encircling the stem and having a laterally-projecting pivot adapted to engage a journal-bearing on the top of the tongue; the slidable collar 9 engaging the upper end of the stem, the adjustable collar 10 below the said slidable collar; the springs 11 and 12 and the locking-lever 14 all constructed and arranged substantially as and for the purposes herein specified.

In testimony that I claim the foregoing I have hereunto set my hand, this 24th day of August, 1897, in the presence of witnesses.

MICHAEL SEITZ.

Witnesses:
HENRY J. W. BORGMANN,
EDWARD T. STOHLMAN.